July 13, 1954     A. R. SCHLOSSHAUER     2,683,502
INSTALLATION FOR OILING MOVING SURFACES AUTOMATICALLY
Filed June 26, 1951     5 Sheets—Sheet 1

INVENTOR
ALFRED R. SCHLOSSHAUER
BY

July 13, 1954  A. R. SCHLOSSHAUER  2,683,502
INSTALLATION FOR OILING MOVING SURFACES AUTOMATICALLY
Filed June 26, 1951  5 Sheets-Sheet 3

INVENTOR
ALFRED R SCHLOSSHAUER
BY

July 13, 1954     A. R. SCHLOSSHAUER     2,683,502
INSTALLATION FOR OILING MOVING SURFACES AUTOMATICALLY
Filed June 26, 1951     5 Sheets-Sheet 5
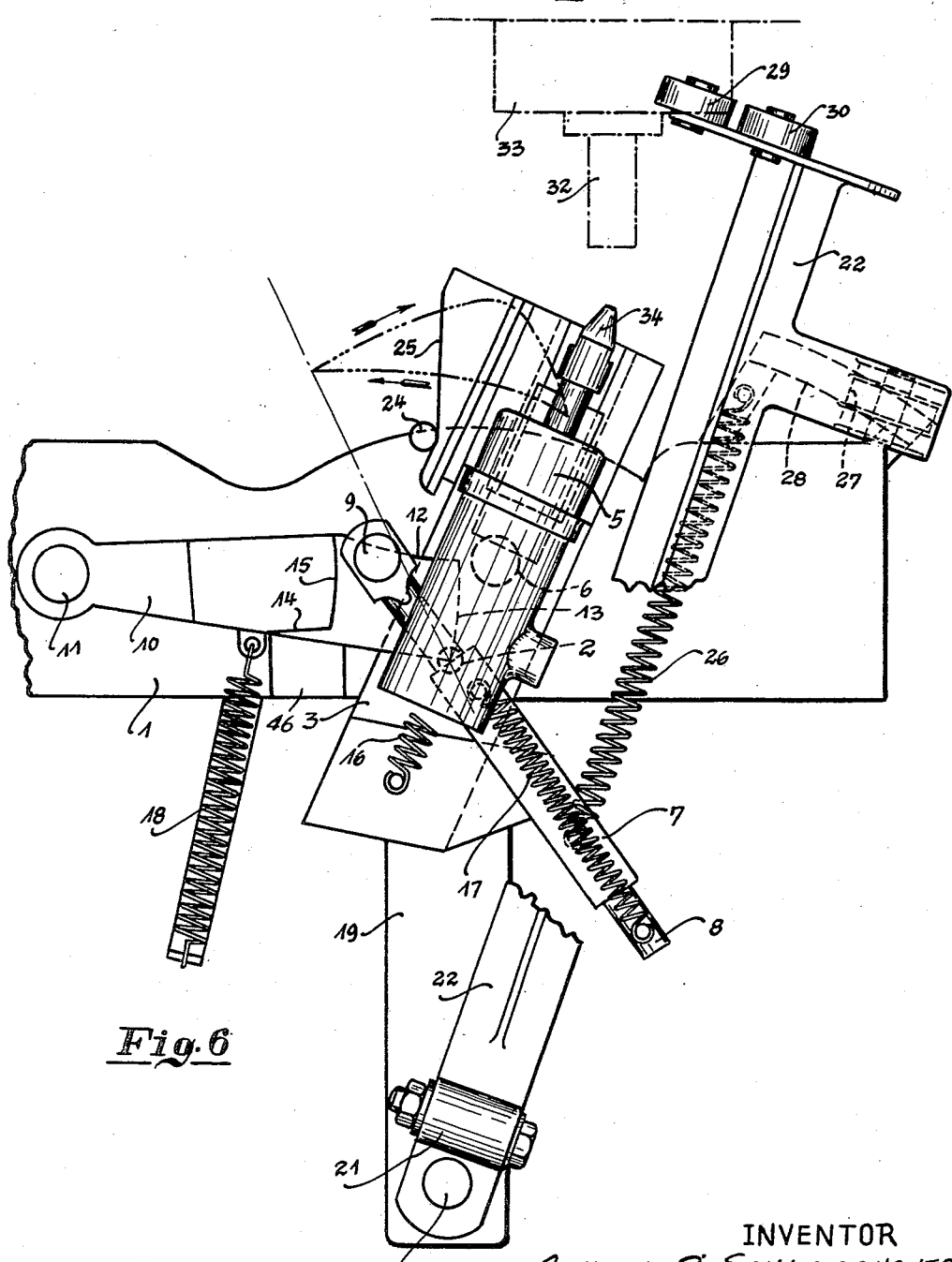
Fig.6
INVENTOR
ALFRED R. SCHLOSSHAUER
BY
Atty Patented July 13, 1954

2,683,502

UNITED STATES PATENT OFFICE 2,683,502

INSTALLATION FOR OILING MOVING SURFACES AUTOMATICALLY

Alfred Reynolds Schlosshauer, Heidelberg, Germany, assignor to Helios Apparate Wetzel and Schlosshauer, Heidelberg, Germany, a German firm Application June 26, 1951, Serial No. 233,533

Claims priority, application Germany June 28, 1950

2 Claims. (Cl. 184—15)

This invention relates to an improvement in devices for automatically oiling moving surfaces such, for example, as the axles of conveyor rollers or the like.

While devices of this general type have heretofore been used, it is an object of the present invention to provide a new arrangement of parts for controlling the lubricating head in its path of movement toward and from the part to be lubricated. That is to say, the present arrangement provides simple and reliable means to assure positive contact between the lubricating head and the surface to be lubricated at a given point in the movement of said part and, likewise, at a given point in the curved path of movement of the lubricating head. In that connection, the construction and arrangement of parts is such that the aforesaid lubricating head rises slowly to the point of contact with the axle, bearing or other part to be lubricated, and falls back to starting position with a short return movement after the lubricant has been expelled, thereby affording a quick return of the lubricating head to its starting position for further operation in connection with the succeeding part to be lubricated.

Another object is to provide a lubricating head having a construction which supplies a regulated quantity of lubricant and prevents dripping when the nozzle of the head is removed from the part to be lubricated.

A preferred and practical embodiment of the invention is shown in the accompanying drawings, in which:

Figure 6 shows the position of the parts at the end of the working stroke;

Figure 8 is a sectional view taken through the lubricating head.

Similar reference characters designate corresponding parts throughout the several figures of the drawings.

Figure 1:
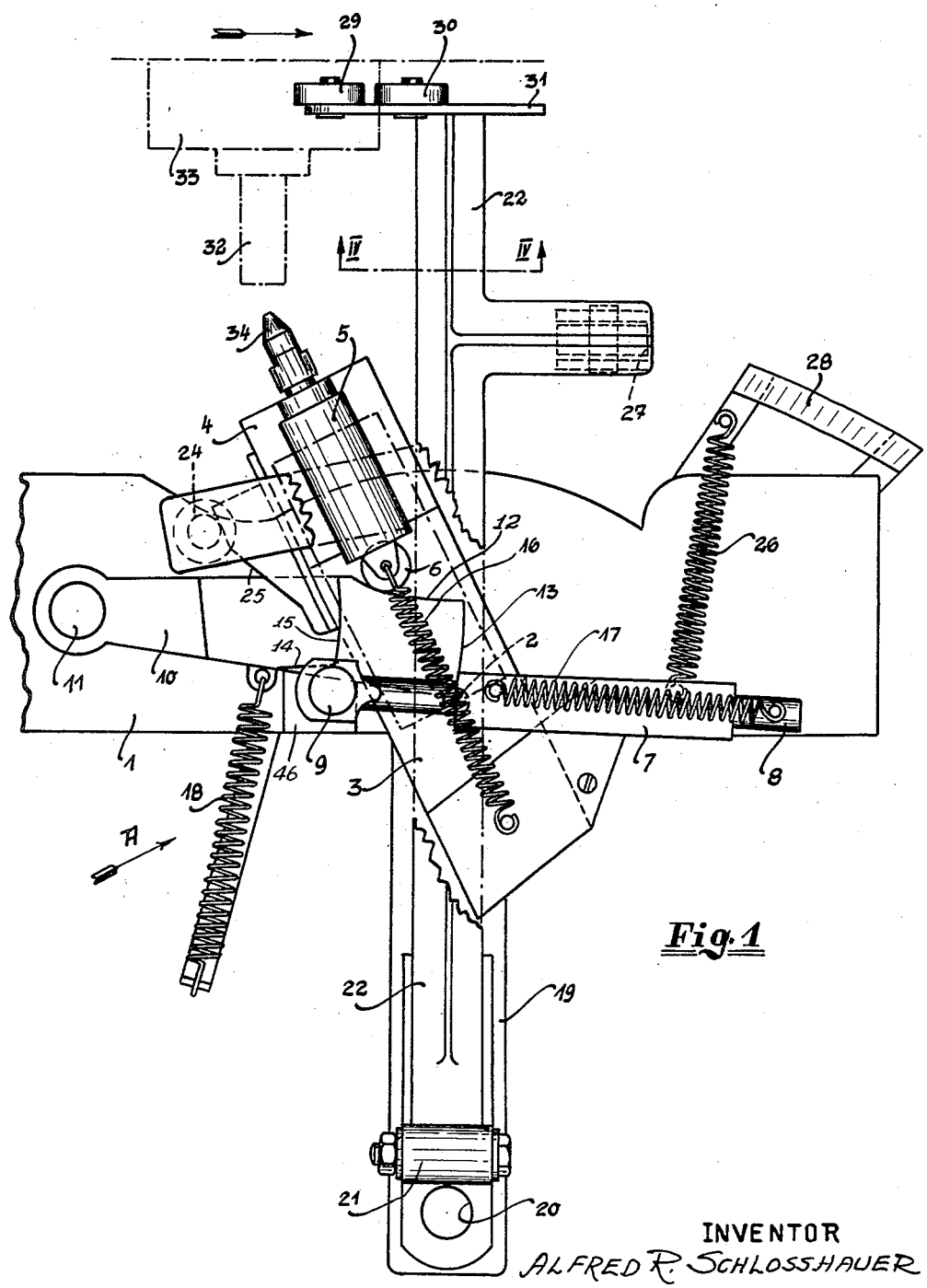
Figure 1 is a partly broken open top view of the lubricating head in its starting position.

A fixed and normally horizontally disposed base 1 carries a pivot 2 for oscillatably mounting a plate 3 having a slide 4 supported thereon. This slide carries the cylinder 5 of the lubricating head and is provided at its rear end with a roller 6. The plate 3 also has fixed thereto an angularly disposed sleeve 7 having slidably mounted therein a push rod 8 provided at its forward end with a roller 9. The rollers 6 and 9 and their corresponding associated parts are operated by a control lever 10 pivoted on a bolt 11 carried by the base 1.

The control lever is provided with two pairs of cam surfaces, the front pair, 12 and 13, being substantially right angularly related, and the rear pair, 14 and 15, also being arranged in substantially right angular relation and located nearer the pivot 11 than the first mentioned pair and in different planes. The lever 10 is tensioned by spring 18 in a clockwise direction. A stop block 46 controls the limit of clockwise rotation of the control lever 10, thereby determining the starting positions of the components of the apparatus.

The slide 4 carrying the cylinder 5 and the roller 6 is held by a spring 16 in retracted starting position on the curved cam surface 12 and the roller 9 is simultaneously held by spring 17 on the cam surface 14.

Figure 2:
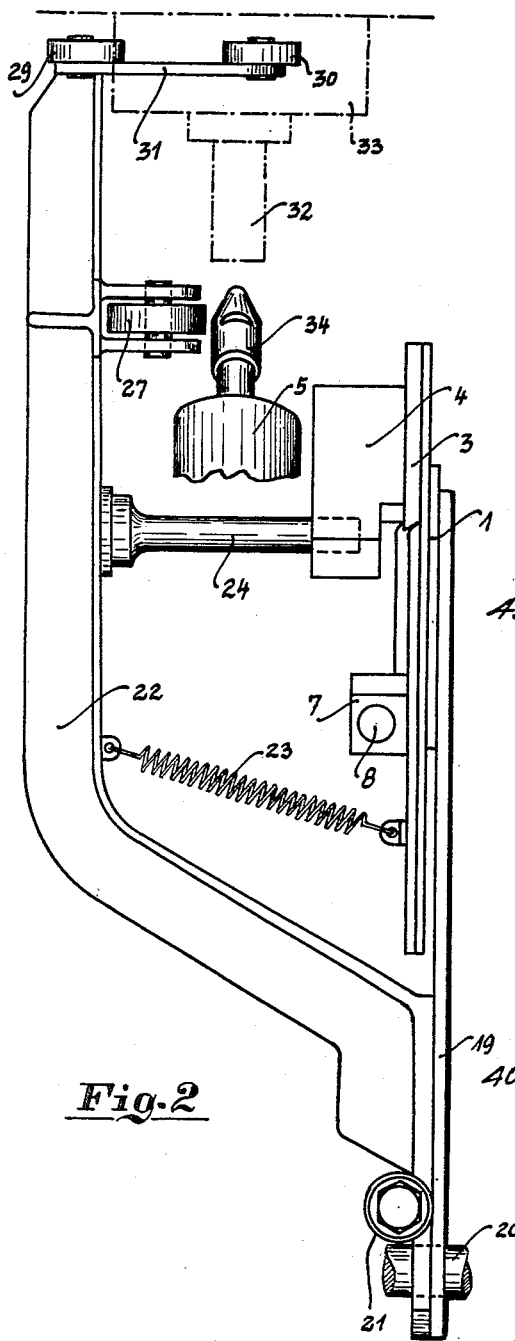
Figure 2 is a side view of the actuating arm.
Figure 3:
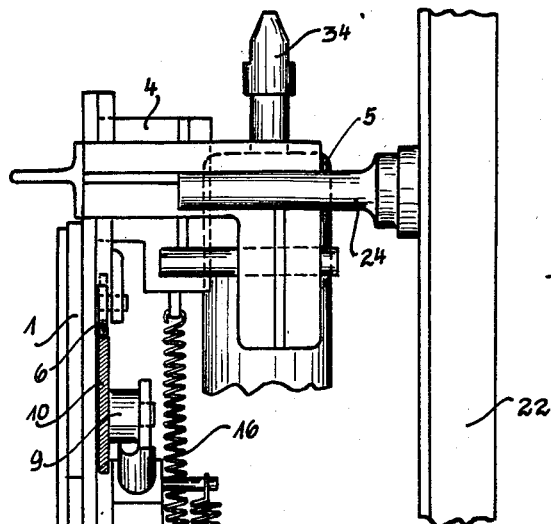
Figure 3 is a detail side view in the direction of the arrow A in Figure 1.
Figure 4:
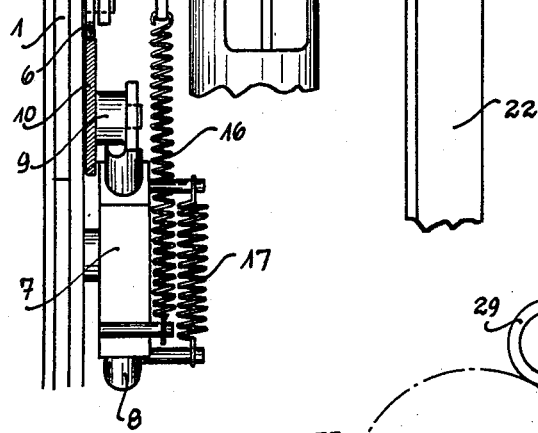
Figure 4 is a sectional view taken on line IV—IV in Figure 1.
Figure 7:
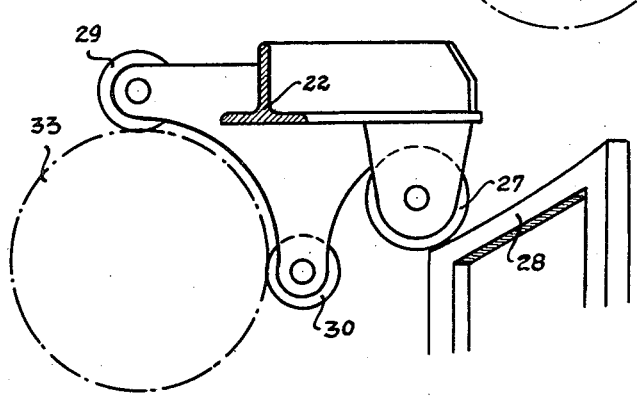
Figure 7 is a partial perspective view of the actuating arm and its lifting means.

The base 1 has an extension 19 supporting a pin 20 carrying a knuckle joint 21 which permits an actuating arm 22 connected therewith to move in both the plane of and at right angles to the base 1 and its extension 19. Said arm is tensioned by spring 23 (Figure 2) toward its starting position. The arm 22 has a lateral extension carrying a downwardly projecting pin 24 which engages with the angularly disposed guide surface 25 on the plate 3. Said plate is also tensioned counterclockwise to maintain 24 and 25 in engagement by a spring 26 connected at one end with member 7 fixed to plate 3 and having its other end anchored to part 28 fixed to base 1. The spring 26 is stronger than spring 18.

The actuating arm 22 has a second lateral extension carrying a guiding or lifting roller 27 which engages a lifting track 28 on the base. The free end of the arm 22 is provided with two rollers 29 and 30 mounted on flange 31 for engaging the roller 33 having bearing 32 to be lubricated.

The base 1 with the aforementioned components attached thereto is so positioned that the flange 31 lies in the path of the rolls 33 and the nozzle 34 of the lubricating head lies in the plane of the axle 32 of the said rolls.

The force of the spring 26 acting through the sleeve 7 causes the plate 3 to have a counterclockwise bias as viewed in Figure 1; the guide surface 25 on the plate 3 bears against the pin 24 carried by the actuating arm 22; the roller 6 under the retractive force of the spring 16 acting on the slide 4 bears upon the cam surface 12 of the control lever 10; the control lever 10 is biased in a clockwise direction by the spring 18; and the stop block 46 acts to limit clockwise rotation of the control lever. Hence, the starting position of the apparatus is determined by the control lever 10 abutting the stop block 46.

The lubricating head is shown in detail in Figure 8 and comprises the cylinder 5 rigidly connected with slide 4, as heretofore indicated. The cylinder 5 is provided with a central longitudinal bore 35 closed at its rear end by a plate 36. The rear portion of the bore 35 also receives a hollow bushing 37, one end thereof abutting the plate 36 and having a lateral port 37$^a$. A piston 39 is slidably mounted in the bore 35. This piston is provided with a portion of reduced diameter which provides a chamber 38 between the portion of reduced diameter and the wall of the bore 35. The piston is also provided with a stem 40 sliding in the bushing 37, and a spring 41 confined between one face of the piston and one end of the bushing urges the piston 39 to charging position with regard to the cylinder 5. The piston 39 is provided with an axial bore 42 having a lateral portion 42$^a$ communicating with the portion of reduced diameter of the piston forming the chamber 38. The piston 39 also carries at its outer end the nozzle 34 which communicates with the bore 42.

The end 40$^a$ of the stem 40 is intended to pass to one side and the other of an inlet passage 43 which is connected to a source of lubricant under pressure.

It will also be seen that the bushing 37 is provided with a port 37$^a$ with a bypass 44 having a port 45 which communicates with the chamber 38.

As previously indicated, the lubricating medium is introduced under pressure through inlet passage 43 which terminates in the hollow bushing 37 behind the end 40$^a$ of stem 40 when the piston 39 is projected forwardly in the starting position. In this position the piston 39 covers the port 45 of the bypass 44. During the working stroke of the cylinder 5, the piston 39 is pushed back into the cylinder 5 when the nozzle mouthpiece contacts one of the passing surfaces to be lubricated. The end 40$^a$ of stem 40 thereby closes the inlet 43 for the lubricating medium, while the chamber 38 is placed in communication with bypass 44 through port 45. With the further backward travel of piston 39, end 40$^a$ of stem 40 pushes a definite quantity of lubricant from secondary line 37$^a$, 44, 45, 38 through bore 42 and nozzle 34.

As soon as the mouthpiece 34 is released from the surface to be lubricated, the piston 39 is projected to the starting position under the pressure of the spring 41, in which position lubricating medium can again enter from the inlet bore 43 into the bore of the bushing and the bypass 44. The quantity of lubricating medium which is expelled by each stroke of the piston is, therefore, determined exactly and subsequent dripping is prevented since the piston 39 closes the bypass 44 in the starting position.

Operation

When a roll 33 of a conveyor or the like passes the location of the lubricating apparatus, the actuating arm 22 is moved because of rollers 29 and 30 engaging the roll 33 and the plate 3 is moved from the starting position shown in Figure 1, because of pin 24 engaging edge 25, toward the right, about the pivot pin 20. As the plate 3 is moved it turns about the pivot 2. As the roller 9 moves over on the curved surface 14 of the control lever 10, the latter is forced against the effect of spring 18 in a counter-clockwise direction about the bolt 11 while the plate 3 turns in the clockwise direction as viewed in Figure 1. The roller 6 travels along the curved track 12 and is pushed forward in the direction of the surface to be lubricated together with the slide 4 and the cylinder 5 carried thereby. The nozzle 34 thus meets thereby the axle 32 of the passing roll 33 and the nozzle is pushed or pressed inwardly, together with the piston supporting it, into the cylinder 5 to start the expelling of the lubricating medium.

Figure 5:
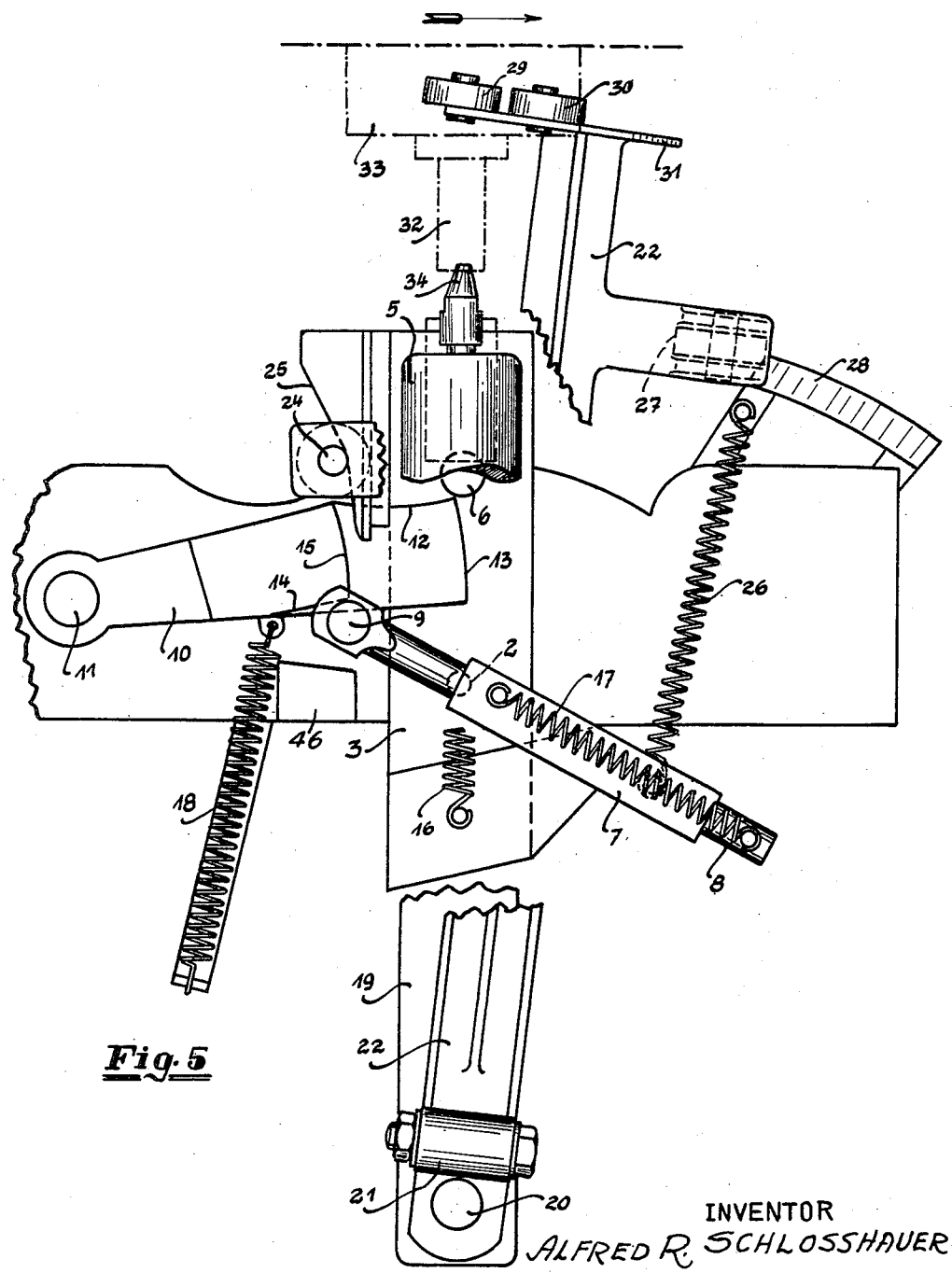
Figure 5 is a top view of the lubricating head in lubricating position.

This relative movement of the parts is continued until the axis of the piston and the axle 32 form a straight line (Figure 5). In this position of the parts the roller 6 is located at the end of the cam 12 and the roller 9 at the end of the cam 14. Since the plate 3 is carried along further by the pin 24, the rollers 6, 9 ride a certain distance on the curved cam surfaces 13, 15 of the control arm 10. As roller 6 rides on 13 the slide 4 with the cylinder 5 is retracted from the advanced position by the spring 16 and the nozzle 34 disengages the axle 32 which has been lubricated, so that the piston 39 carrying the mouthpiece 34 is again shoved outwardly of the cylinder 5.

Control arm 10 can return to its initial position under the influence of spring 18, whereby roller 9 initially runs along the curved cam surface 15, thereafter, in the course of the further rotary movement of plate 3, to swing clear of the curved cam surface 15 since the travel of the push rod 8 is limited in its guide track. In the meantime, however, roller 27 has reached the adjustable lifting or guide track 28 and has lifted the actuating arm 22 to the point where rollers 29, 30 are released from roller 33 and the movement in the direction of the initial position is allowed.

Spring 26, which, as shown in Figure 6, is now under the greatest tension, now pulls plate 3 around pivot 2 in counter-clockwise direction, with the angularly disposed guide surface 25 of plate 3 pressing against the projecting pin 24. The latter moves actuating arm 22 in the same direction whereas spring 23, likewise under tension (Figure 2), again forces actuating arm 22 downward into its initial position as indicated in Figures 1. Plate 3 also returns to the initial position as shown in Figure 1. In this process roller 9 again runs initially along the curved cam surface 15, displacing push rod 8, counter the spring power of spring 17, until the rod reaches the intersection of curved cam surfaces 15 and 14 and until it is again pushed by spring 17 into its initial position on track 14.

During the initial pivotal movement of the plate 3 to bring the nozzle 34 into lubricating position, it substantially follows a path shown by the curved dot and dash triangle shown in Figure 6, while on the return movement the path of the nozzle 34 is flattened in accordance with the lower dot and dash line.

By imparting to the cam surfaces 12, 13 and 14, 15 corresponding dimensions and profile any desired form can be given to the relatively triangular movement of the cylinder 5 to cover the needed lubrication. The forward movement of the nozzle occurs more or less rapidly, so that the contact between the nozzle and lubricating surface can be appropriately regulated.

From the foregoing, it will be seen that the construction described comprises a lubricating head 5 having a nozzle 34 and supporting means therefor, said supporting means including the plate 3 and the slide 4, respectively for oscillatably and slidably mounting the head 5 adjacent the part to be lubricated. The supporting means 3 and 4 for the head 5 operate in conjunction with the control lever 10 to synchronize the forward and backward movement of the nozzle 34 relative to the part 32 to be lubricated, while the actuating means in the form of the arm 22 having the pin 24 engaging with edge 25 of plate 3 controls the oscillation of the plate 3 on pivot 2 against the force of the spring 26. The arm 22 is tensioned downwardly and toward its starting position by spring 23 and when rollers 29 and 30 engage with roll 33 of the part to be lubricated, the arm 22 carrying roller 27 moves until it reaches the lifting track 28, whereupon, the rollers 29 and 30 are lifted so that they disengage from roll 33 and springs 23 and 26 release their energy to restore the parts to the starting position shown in Figure 1. The pin 24 is of sufficient length to remain in contact with the guide surface 25 when the roller 27 carried by the actuating arm 22 is upon the highest portion of the lifting track 28.

Through lifting of the actuating arm 22, for example, by means of a rotating or traversing wedge piece, after the spring 23 has been unhooked, the new arrangement may be put out of action at any time. The lubricating medium can be conducted into the lubricating head either through a conduit attached to a central lubricating pump, whereby the conduit is kept under low pressure to obtain a sufficient replenishment during the pauses in the movement of the lubricating head, or by a lubricating pump which is controlled by one of the movements of the lubricating apparatus, for instance, those of the actuating arm 22.

What is claimed is:

1. An apparatus for automatically lubricating a moving part, comprising, a base including an extension, a control member pivoted to the base about a pivot member, front and rear pairs of cam surfaces on the control member, a spring for normally tensioning the control member in clockwise direction, an actuating arm pivoted at one end to the extension of the base to move parallel to the plane thereof and at right angles thereto, a pin carried by the medial portion of the arm, roller engaging means at the free end of the arm, a plate pivoted to the base beneath the arm, a guide member carried by one edge of the plate for engaging with said pin, means on the base to lift the arm at the end of the working stroke of the arm, a slide carried by the plate, said slide having at its rear end a roller in operative relationship with said front pair of cam surfaces, a lubricating head on said slide, a spring for retracting said slide and said lubricating head thereon inwardly of the plate, said spring being attached to the slide at one end and to the plate at the other end, a sleeve rigidly connected to the plate and oblique thereto, a push rod in said sleeve, said push rod having at its forward end a roller in operative relationship with said rear pair of cam surfaces, a spring means between the sleeve and push rod for projecting said push rod forwardly whereby the front end of said push rod will follow said rear pair of cam surfaces of said control member, and a spring having one end connected to said sleeve and one end connected to said base, said latter spring being stronger than said spring for normally tensioning the control member in clockwise direction, said latter spring tending to pull said plate in a counterclockwise direction, whereby the forward end of said push rod follows the rear pair of cam surfaces of said control member and the rear end of said slide follows the front pair of cam surfaces of said control member, whereby the said control member is forced counterclockwise of the pivot point against the spring normally tensioning the said control member in clockwise direction, and whereby the lubricating head is successively moved from lubricating position and back again to starting position.

2. An apparatus for automatically lubricating a moving part comprising, a base having an extension, a lubricating head having a nozzle, support means on said base for mounting said lubricating head for oscillating and sliding movement, said support means including a slide to which said head is attached, and a plate attached to said base, said plate having said slide attached thereto, a spring acting on said head to bias it to a retracted position, control means pivoted on said base, spring means attached to said control means for tensioning said control means in clockwise direction, said control means having first and second cam surfaces, a first cam follower means on said slide cooperating with said first cam surfaces, a sleeve rigidly connected to said plate and oblique thereto, a push rod in said sleeve, said push rod having at its forward end a roller in operative relationship with said second cam surfaces, a spring means between the sleeve and push rod for projecting said push rod forwardly whereby the forward end of said push rod will follow the second cam surfaces of said control means, a spring means having one end connected to said sleeve and the other end connected to said base for pulling said plate in counterclockwise direction, and actuating means comprising an arched arm being attached at one end to said base at its extension by a knuckle joint, a spring means urging said arm downwardly, said spring means being connected at one end to said plate and at the other end to said arm, said arm having at its other end contact means for engaging the moving part to be lubricated, lifting means on said base for engaging said actuating means at the end of the working stroke thereof, and means carried by said plate for returning said arm to starting position whereby said contact means is disengaged from said part after it has been lubricated.

References Cited in the file of this patent

UNITED STATES PATENTS

| Number | Name | Date |
| --- | --- | --- |
| 1,567,623 | Smith | Dec. 29, 1925 |

FOREIGN PATENTS

| Number | Country | Date |
| --- | --- | --- |
| 357,385 | Great Britain | Sept. 24, 1931 |
| 549,155 | Great Britain | Nov. 9, 1942 |